No. 862,902. PATENTED AUG. 13, 1907.
J. W. GUILL.
WIRE STRETCHER.
APPLICATION FILED FEB. 12, 1907.
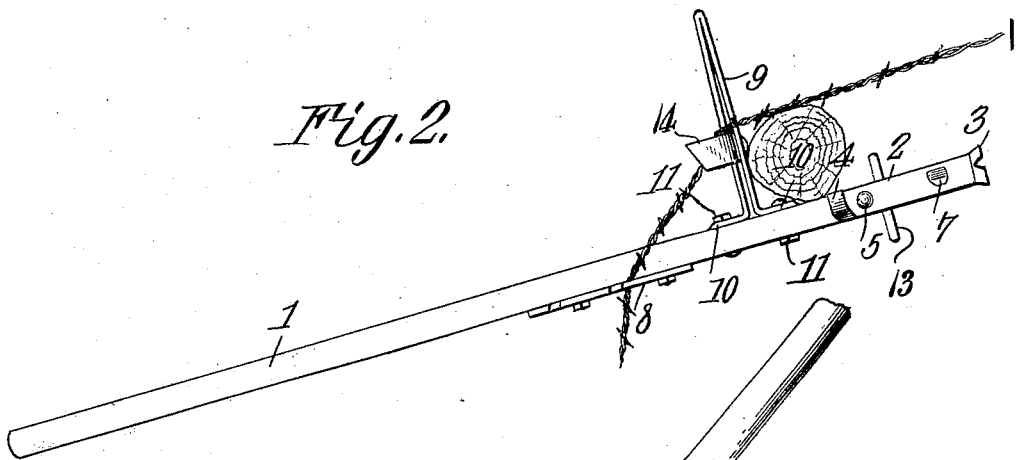
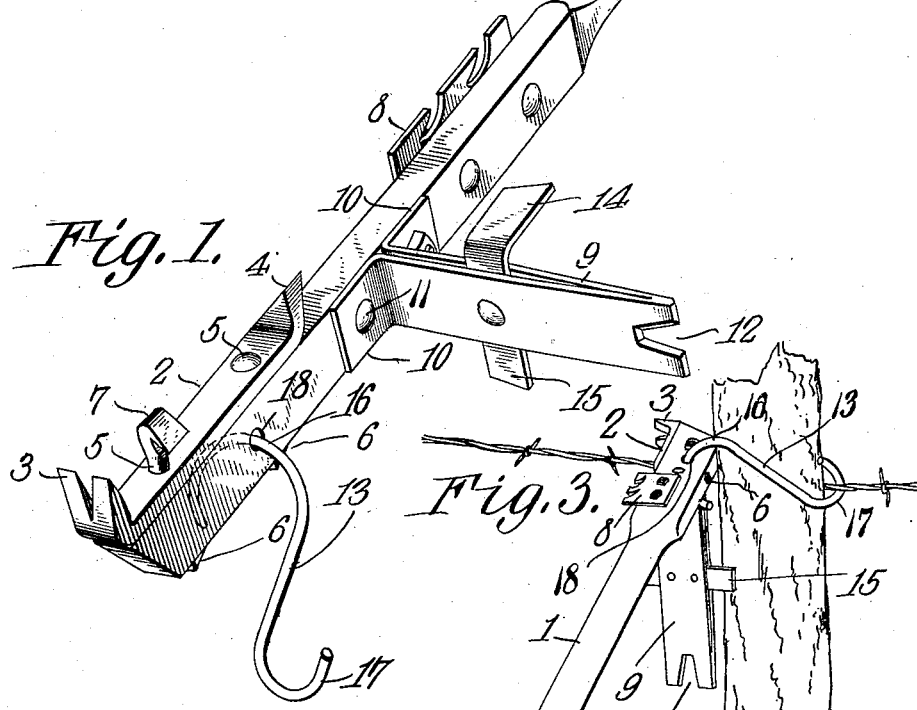
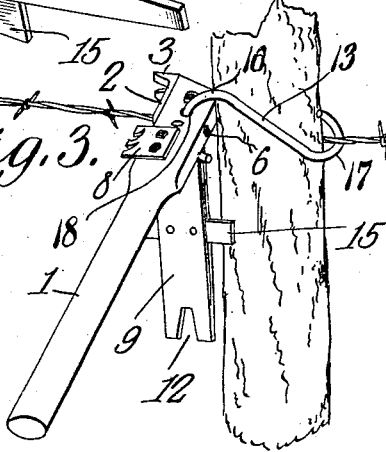
John W. Guill,
INVENTOR
By C. A. Snow & Co.
ATTORNEYS
WITNESSES:

UNITED STATES PATENT OFFICE.

JOHN W. GUILL, OF MAPLETON, KANSAS.

WIRE-STRETCHER.

No. 862,902.  Specification of Letters Patent.  Patented Aug. 13, 1907.

Application filed February 12, 1907. Serial No. 357,024.

*To all whom it may concern:*

Be it known that I, JOHN W. GUILL, a citizen of the United States, residing at Mapleton, in the county of Bourbon and State of Kansas, have invented a new and useful Wire-Stretcher, of which the following is a specification.

This invention relates to improvements in wire stretchers.

The object of the invention is to provide a wire stretcher similar to that shown in U. S. Patent No. 642,259, granted to H. F. Ruble and myself as joint inventors, but having certain improvements in the construction and arrangement of parts whereby its efficiency is increased and its cost of manufacture greatly reduced.

In the accompanying drawings of a wire stretcher constructed in accordance with this invention,—Figure 1 is a perspective view of the stretcher; and Fig. 2 is a plan view showing one of the applications of the invention. Fig. 3 is a perspective view showing a different use of the device, wherein the hook is employed as a means of taking up the strand wire or the border wire of a mesh fence.

Referring to the drawings, the stretcher comprises a lever 1 of wood of substantially circular cross-section at one end forming a handle, and of rectangular cross-section at the other end and provided with steel or iron parts bolted thereto. At the end of the lever opposite the handle is bolted to the lever upon the edge thereof a bar 2 of steel having laterally extended ends; one of said ends slightly overlaps the end of the lever and is formed into a chisel-edged claw 3; the other and inner end of said bar has a chisel-edge 4 and is adapted to be used in cutting wire or as a fulcrum for the lever. This bar is secured to the lever by means of the bolts 5—5 extending through the bar and the lever and locked in engagement by the nuts 6—6; one of these bolts is provided with a hooked head 7 and is placed adjacent to the claw so as to coöperate with the claw in holding a wire, thus serving the double function of retaining the bar upon the lever and the wire within the claw. The end of the lever is inclined inwardly from the edge supporting the claw to permit of the free action of the claw. Spaced from the end of the bar and rigidly mounted upon the side thereof is the plate 8 having a laterally-extending toothed edge overhanging the edge of the lever in alinement with the claw.

Between the bar and the toothed plate and upon the side of the lever opposite to the toothed plate an arm 9 is rigidly secured extending at right angles thereto. This arm is substantially equal in width to the width of the lever and is constructed of a plate of metal centrally folded upon itself and having laterally extended ends 10 provided with bolt holes for the admission of bolts 11 to secure the arm to the lever. The arm is provided with a notch 12 across its free end for holding a wire. A cross-bar is secured to said arm intermediate of its ends and between the sides of said arm; one end of said cross-bar extends from said arm transversely of the stretcher and in a direction opposite to that of the claw at the end of the stretcher; the other end of said cross-bar extends longitudinally of the stretcher toward the handle and is provided with a beveled outer end.

In stretching woven wire fencing, the crank or lever 1 is provided near its fulcrum end with a hook 13 adapted to engage a mesh of the woven wire first near one and then near the other marginal or stringer wire and it will be noted that whether in the use of the device in stretching woven wire or strand wires, the flat surfaced angle arm 9 forms a suitable fulcrum against the post to prevent rolling or turning of the lever, and thus avoid any tendency of the strand to slip out of the notch by which it is engaged. This arm also carries a finger or projection 14 which is adapted to lie against the inner side or surface of the post or other object upon which the lever is fulcrumed to assist in the above indicated operation of preventing slipping, turning or twisting of the lever during the operation, and the strip or plate on which this projection or finger is formed may be extended as shown at 15 beyond the opposite side of the arm 9 to increase the width of the bearing.

In Fig. 3 there is shown that use of the device which consists in stretching a strand wire or the border wire of a mesh fence, and it will be noted moreover that as this hook is preferably constructed with a large supporting terminal 16 and a small terminal 17, said supporting terminal being engaged with an opening 18 in the shank of the tool, said hook may be removed when not required, and it has the further function of acting as a means of holding the shank or lever in an adjusted position to maintain a wire under tension without requiring the continued effort of the operator. For instance, when the stretcher has been used to draw a wire up to the proper tension and the lever or handle is thereby drawn up to a position approximately parallel with the stretched wire or with any other wire or object which is in proximity thereto, the hook 13 can be engaged with the handle or shank by one of its terminals, and with an adjacent object such as a wire with the other terminal to maintain the shank in the desired position.

Having fully described my invention, what is claimed and desired to be secured by Letters Patent is:—

1. In a wire stretcher the combination of a lever, one end thereof constituting a handle and the other end provided with a laterally-extending claw, and a laterally-extending arm rigidly secured to the lever intermediate of its ends, said arm comprising a centrally folded metallic bar with oppositely-extended ends adapted to be secured to the lever, and a cross bar secured between the folded sides of the arm, substantially as described.

2. In a wire stretcher the combination of a lever, a handle at one end thereof, a laterally-extending claw at the other end thereof, a laterally-extending arm rigidly secured to the lever intermediate of its ends, and a cross-bar rigidly secured to said arm, one end of said cross-bar extending beyond its supporting arm transversely of said lever and the other end of said cross-bar extending longitudinally of said lever, substantially as described.

3. In a wire stretcher the combination of a lever, a handle at one end and a lateral projection at the other end thereof, a lateral arm extending from said lever intermediate of its ends, a cross-arm rigidly secured to said arm and having one end projecting in a plane at right angles to said lever and its other end beveled and extending in a direction parallel to the lever and toward the handle thereof.

4. In a wire stretcher the combination of a lever, a handle at one end and a lateral projection at the other end thereof, a lateral arm rigidly secured to said lever intermediate of its ends and having a notched end, a cross-arm rigidly secured to said arm and having one end projecting in a plane at right angles to said lever and its other end beveled and extending in a direction parallel to the lever and toward the handle thereof, and a notch in said lever adjacent said arm, substantially as described and for the purpose set forth.

5. A wire stretcher comprising a lever, an arm extending laterally therefrom at a point between the ends thereof, means immovably connected to the arm for engagement with an object upon which the arm is disposed to be fulcrumed, and wire engaging means immovably connected to the lever.

6. A wire stretcher comprising a lever, a laterally projecting arm rigidly connected to the lever at a point between the ends thereof and disposed to bear against an object constituting the fulcrum of the lever, a projecting device rigidly connected to and extending laterally from the arm, a wire engaging device immovably connected to the lever, and a hook loosely connected to and extending from the lever.

In testimony that I claim the foregoing as my own, I have hereto affixed my signature in the presence of two witnesses.

JOHN W. GUILL.

Witnesses:
WM. W. BALL,
J. E. CLAYTON.